US010762047B2

(12) United States Patent
Armangau et al.

(10) Patent No.: US 10,762,047 B2
(45) Date of Patent: Sep. 1, 2020

(54) RELOCATING COMPRESSED EXTENTS USING FILE-SYSTEM HOLE LIST

(71) Applicant: EMC IP Holding Company LLC, Hopkinton, MA (US)

(72) Inventors: Philippe Armangau, Acton, MA (US); Ajay Karri, South Grafton, MA (US); Monica Chaudhary, South Grafton, MA (US); Alexander Daniel, Westford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 8 days.

(21) Appl. No.: 16/176,767

(22) Filed: Oct. 31, 2018

(65) Prior Publication Data

US 2020/0134045 A1    Apr. 30, 2020

(51) Int. Cl.
G06F 3/06 (2006.01)
G06F 16/17 (2019.01)
G06F 12/02 (2006.01)
G06F 16/18 (2019.01)

(52) U.S. Cl.
CPC .......... *G06F 16/1727* (2019.01); *G06F 3/061* (2013.01); *G06F 3/064* (2013.01); *G06F 3/067* (2013.01); *G06F 3/0631* (2013.01); *G06F 3/0644* (2013.01); *G06F 3/0656* (2013.01); *G06F 3/0659* (2013.01); *G06F 12/0246* (2013.01); *G06F 16/1847* (2019.01); G06F 2212/1044 (2013.01); G06F 2212/2022 (2013.01); G06F 2212/401 (2013.01); G06F 2212/7202 (2013.01); G06F 2212/7207 (2013.01)

(58) Field of Classification Search
CPC ...... G06F 3/0608; G06F 3/061; G06F 3/0631; G06F 3/064; G06F 3/0644; G06F 3/0656; G06F 3/0659; G06F 3/067; G06F 3/0683; G06F 12/0246; G06F 16/1727; G06F 16/1847; G06F 2212/1044; G06F 2212/2022; G06F 2212/401; G06F 2212/7202; G06F 2212/7207
USPC ............... 707/693; 710/68; 711/165, 171
See application file for complete search history.

(56) References Cited

U.S. PATENT DOCUMENTS

| | | |
|---|---|---|
| 9,779,023 B1 | 10/2017 | Armangau et al. |
| 9,880,743 B1 | 1/2018 | Armangau et al. |
| 9,959,049 B1 | 5/2018 | Armangau |

(Continued)

OTHER PUBLICATIONS

Armangau, Philippe, et al.; "Overwriting Compressed Data Extents," U.S. Appl. No. 15/499,206, filed Apr. 27, 2017.

(Continued)

*Primary Examiner* — Gary J Portka
(74) *Attorney, Agent, or Firm* — BainwoodHuang

(57) ABSTRACT

A technique for writing data in a file system includes aggregating data received in a set of I/O requests into a batch that includes multiple extents of data. After compressing a current extent of the batch and determining that the compressed extent does not fit in a space where a previous version of the extent is stored, the technique performs an FS-relocate operation by accessing an F S-hole list provided for the file system and selecting a hole, from the FS-relocate list, which is large enough to accommodate the compressed extent. The technique then places the compressed extent in the selected hole.

17 Claims, 8 Drawing Sheets

(56) References Cited

U.S. PATENT DOCUMENTS

| | | | |
|---|---|---|---|
| 9,985,649 B1 | 5/2018 | Bassov et al. | |
| 10,156,993 B1* | 12/2018 | Armangau | G06F 3/0608 |
| 2011/0218974 A1* | 9/2011 | Amit | G06F 16/00 |
| | | | 707/693 |
| 2015/0339314 A1* | 11/2015 | Collins | G06F 16/1744 |
| | | | 707/627 |
| 2017/0031940 A1* | 2/2017 | Subramanian | G06F 16/13 |
| 2018/0329631 A1 | 11/2018 | Swift | |

OTHER PUBLICATIONS

Armangau, Philippe, et al.; "Selectively Operating Data Storage Equipment in a "Stripe Write" Mode and a "Fill Hole" Mode," U.S. Appl. No. 15/279,783, filed Sep. 29, 2016.

Kuang, Yaming, et al.; "Recovering Compressed Data to Reduce Data Loss," U.S. Appl. No. 15/395,968, filed Dec. 30, 2016.

* cited by examiner

RELOCATING COMPRESSED EXTENTS USING FILE-SYSTEM HOLE LIST

BACKGROUND

Data storage systems are arrangements of hardware and software that include storage processors coupled to arrays of non-volatile storage devices, such as magnetic disk drives, electronic flash drives, and/or optical drives. The storage processors service storage requests, arriving from host machines ("hosts"), which specify blocks, files or other data elements to be written, read, created, deleted, and so forth. Software running on the storage processors manages incoming storage requests and performs various data processing tasks to organize and secure the data elements stored on the non-volatile storage devices.

Some data storage systems employ data compression to improve storage efficiency. For example, a software program running on a storage processor may perform compression in the background, e.g., by reading data from disk, compressing the data, and writing the compressed data back to disk. To read data that has already been compressed, the program may work in the opposite direction, e.g., by fetching compressed data from disk, decompressing the data, and presenting the decompressed data to a requesting program.

As another example, software running on an I/O (Input/Output) stack of a storage processor may perform data compression inline with storage requests, such that incoming data are compressed prior to the first time they are written to disk. This arrangement helps to avoid over-commitment of storage resources by avoiding initial, uncompressed writes.

SUMMARY

Unfortunately, inline compression can present significant challenges. For example, a data storage system may store inline-compressed data elements in extents of variable size, which are just big enough to accommodate the compressed data elements they store. If a host application makes a change to a data element after it has already been compressed and written, the new compressed data element may not fit in the space that was provided for the previous data element. For example, the new data element may not be as compressible as was the previous data element. Such situations can be burdensome to data storage systems, as space must be provided somewhere to accommodate the new compressed data.

Often, such systems allocate new storage space to accommodate the new compressed data. But space allocation is a time-consuming task for a storage system to undertake. Allocating space in this fashion on a regular basis can impair inline compression, as storage processors may need to throttle back compression to keep up with the high volume of allocating writes.

In addition, allocating new space for writes generally means abandoning the spaces where the original data were stored, effectively creating "holes," i.e., ranges of storage that contain no currently-valid data. As new holes accumulate in a storage system, storage efficiency begins to drop, eventually erasing most if not all of the benefits of performing compression.

Garbage collection may eventually engage and compact away accumulated holes, but relying on garbage collection is far from optimal, especially in flash-based storage systems, as garbage collection is write-intensive and thus contributes to premature wear of flash storage devices. Garbage collection also fails to address overprovisioning of storage, which may be necessary to accommodate the large number of holes that accumulate in a system between successive runs of garbage collection.

In contrast with prior approaches, an improved technique for writing data in a file system includes aggregating data received in a set of I/O requests into a batch that includes multiple extents of data. After compressing a current extent of the batch and determining that the compressed extent does not fit into a space where a previous version of the extent is stored, the technique performs an FS-relocate operation by accessing an FS-hole list provided for the file system and selecting a hole, from the FS-hole list, which is large enough to accommodate the compressed extent. The technique then places the compressed extent in the selected hole.

Advantageously, the improved technique effectively reuses holes that have been identified in the FS-hole list. As the FS-hole list typically identifies a large number of holes, given that it is provided at the level of the file system, the domain of available holes in which to place the compressed extent increases from one, in the case of the prior approach, to a large number, such that the chances of finding a hole big enough to accommodate the compressed extent are high. Storage efficiency increases significantly, as holes are not simply abandoned. Instead, holes have an opportunity to be put to productive use later. New allocations are also reduced, as allocation is not required as often to accommodate new data. Similarly, reliance upon garbage collection is reduced. Indeed, garbage collection may be performed less frequently, sparing flash devices of excessive numbers of writes.

Certain embodiments are directed to a method of writing data in a data storage system. The method includes aggregating a set of data received in I/O (Input/Output) requests into a batch of data. The batch of data includes multiple extents, and each extent is directed to a respective logical address in a file system running in the data storage system. The method further includes compressing a current extent of the batch of data to produce a compressed extent. The current extent is directed to a logical address that is already backed by a fragment in the data storage system, such that a write of the compressed extent is an overwrite. The method still further includes performing an FS-relocate operation, the FS-relocate operation (i) accessing an FS-hole list provided for the file system to select a hole large enough to accommodate the compressed extent, each hole in the FS-hole list representing a range of storage in the file system that contains no currently-valid data, and (ii) placing the compressed extent into the selected hole in the FS-hole list.

Other embodiments are directed to a data storage system constructed and arranged to perform a method of writing data, such as the method described above. Still other embodiments are directed to a computer program product. The computer program product stores instructions which, when executed on control circuitry of a data storage system, cause the data storage system to perform a method of writing data, such as the method described above.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for writing data in a file system includes aggregating data received in a set of I/O requests into a batch that includes multiple extents of data. After compressing a current extent of the batch and determining that the compressed extent does not fit in a space where a previous version of the extent is stored, the technique performs an FS-relocate operation, by accessing an FS-hole list provided for the file system and selecting a hole, from the FS-relocate list, which is large enough to accommodate the compressed extent. The technique then places the compressed extent in the selected hole.

Figure 1:
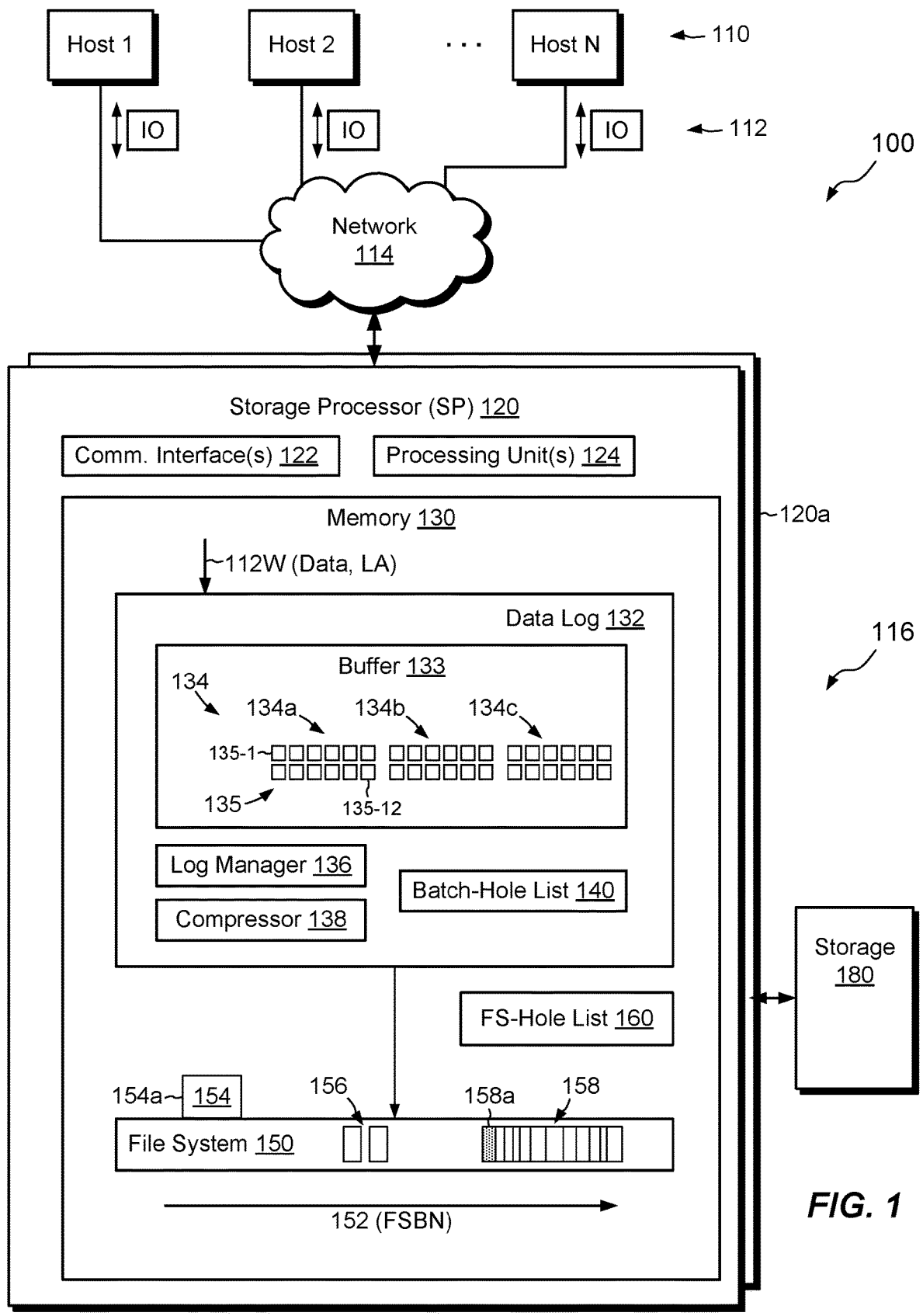
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to a form suitable for use by the SP 120. The set of processing units 124 includes one or more processing chips and/or assemblies, such as numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by operation of software instructions, a data log 132, a file system 150, and an FS-hole list 160. The data log 132 includes a buffer 133, a log manager 136, a compressor 138, and a batch-hole list 140. The buffer 133 is configured to receive incoming data specified by I/O write requests 112W and to aggregate the received data into batches 134 (e.g., batches 134a, 134b, and 134c). Each batch 134 includes multiple extents 135 (e.g., 135-1 to 135-12), which may be ordered, for example, by time of receipt into the data log 132. The data log 132 is itself configured to hold incoming data temporarily (in volatile memory) until the data can be placed in appropriate locations in the file system 150, which is backed by the storage 180.

In some examples, the buffer 133 is implemented in volatile memory, such as DRAM (Dynamic Random Access Memory), and the DRAM may be battery-backed and/or mirrored to SP 120a, such that the data are deemed persisted once they are stored in the buffer 133. The SP 120 may acknowledge completion of host writes back to requesting hosts 110 once the data are stored in the buffer 133 and mirrored across SPs.

The file system 150 has a physical address space 152, which ranges, for example, from zero to some large number. The physical address space 152 is denominated in blocks, with each block address identified by File System Block Number, or "FSBN." A "block" is typically the smallest unit of storage space that the file system 150 can allocate. Blocks in the file system 150 are normally uniform in size, with typical block sizes being 4 kB or 8 kB, for example.

The file system 150 stores a segment 158, which may be composed of multiple contiguous blocks, i.e., blocks having consecutive FSBNs. A typical size of segment 158 may be 8 blocks, which works out to 64 kB for an 8-kB block size. However, the number of blocks in segment 158 may vary. Segment 158 stores extents of compressed data for a file 154a, which is designated by inode (index node) 154. Here, segment 158 includes multiple extents of compressed data, including extent 158a (shaded). In an example, inode 154 is a data structure, stored in one or more blocks of file system 150, which includes information about the file 154a, such as it size and ownership. Inode 154 also stores pointers to data of the file 154a. For example, inode 154 stores pointers to data blocks and/or to indirect blocks (IBs), which themselves store arrays of pointers to data of the file 154a. IBs may be arranged in multiple layers, forming an IB tree, with IBs in the bottom layer called "leaf IBs." Such leaf IBs may include pointers to other mapping metadata, such as Virtual Block Maps (VBMs) 156.

One should appreciate that the file system 150 may include any number of files, each having a respective inode, and any number of segments for each file. FIG. 1 shows only a single file 154a and a single segment 158 for simplicity.

Each file in the file system 150 has a logical address range, with different logical addresses corresponding to different offsets into the file. Logical addresses may be provided in block-sized increments. For instance, each logical address of file 154a may represent an 8-kB increment of storage, assuming a file-system block size of 8 kB. Each increment that corresponds to a logical address may be referred to herein as a "logical block." File system metadata maps logical blocks of files to corresponding physical blocks in the physical address space 152. As used herein, the term "logical address" refers to a logical designation of any logical block in the file system 150. For example, two logical addresses in the file system 150 need not belong to the same file.

In cases where inline compression is performed, the file system 150 may map each logical block to a corresponding extent in a segment (such as segment 158). Each extent is typically smaller than a physical block, with the size of each extent reflecting the amount of compression achieved.

The FS-hole list 160 is a list of holes that have been found within the file system 150. Typically, the holes in the FS-hole list 160 span all of the files in the file system 150. The SP 120 may place a hole onto the FS-hole list 160 anytime that it creates or encounters a hole when performing its activities.

By contrast, the batch-hole list 140 is a list of holes that have been found within mapping metadata (e.g., IBs and/or VBMs) used for mapping the extents 135 in the current batch 134. For example, the batch-hole list 140 may include one set of holes when processing a first batch 134a, but may include another, different set of holes when processing a second batch 134b. Thus, the batch-hole list 140 is scoped to the current batch 134, whereas the FS-hole list 160 is scoped to the entire file system 150. Although only one file system 150 is shown, one should appreciate that the data storage system 116 may contain or host any number of file systems, in which case each file system may have its own respective FS-hole list 160.

In example operation, hosts 110 issue I/O requests 112 to the data storage system 116. The I/O requests 112 direct the data storage system 116 to perform reads and/or writes of one or more data objects, such as LUNs (Logical UNits), file systems, virtual machine disks, and the like. SP 120 receives the I/O requests 112 at the communication interface(s) 122 and passes them to memory 130 for further processing. Some of the I/O requests 112 are writes 112W directed to one or more data objects. In an example, each write 112W specifies both data to be written and a logical address (LA) at which the data are to be stored. The logical address may be provided as a LUN and an offset, as a file system identifier (FSID) along with a file name and offset, as an NFS handle and offset, or in some other suitable manner. In some examples, the SP 120 operates additional object layers (not shown) above the file system 150, and the SP 120 maps a logical address that accompanies a write request 112W to a different logical address relative to the file system 150.

As new data arrive in writes 112W, the buffer 133 receives the specified data and places them in block-sized extents 135. The log manager 136 aggregates extents 135 into batches 134 (e.g., 134a, 134b, 134c, etc.). In some examples, each batch 134 contains a predetermined number of extents 135, such as twelve extents per batch, or any other suitable number. For each extent 135, the data log 132 stores a descriptor that identifies the logical address (LA) to which the respective data are directed.

The log manager 136 performs various processing tasks on a per-batch basis. In an example, the log manager 136 obtains a batch 134, compresses each of the extents 135 in the batch 134, and compacts the compressed extents into a contiguous range of memory. The log manager 136 may then flush the contiguous range of memory for the batch 134 to the file system 150. The file system allocates a new segment (like segment 158) for holding the compressed data and stores the compressed data in the new segment.

Operation varies from the above when some extents 135 of a batch 134 are not new writes but are rather overwrites, i.e., writes directed to logical addresses where previous versions of data are already stored. Ideally, the file system 150 attempts to place each such compressed extent in the same location where the previous version resides. For example, to place extent 135-1 in the same location as the previous version (at the same logical address), the data log 132 retrieves mapping metadata for extent 135-1, such as a VBM. The data log 132 reads the mapping metadata and identifies a current size of the fragment that stores the previous version of extent 135-1. If the compressed version of extent 135-1 fits within the current size of the fragment, then the overwrite can proceed in place, in an arrangement we refer to as "fragment fill." To achieve fragment-fill, the data log 132 configures the extent 135-1 in the buffer 133 to flush to the already-mapped location of the previous version. When the data log 132 then flushes the batch that includes the compressed data of extent 135-1, the file system 150 overwrites the previous version with the new version. No changes in mapping metadata are needed.

However, if the compressed data of extent 135-1 does not fit into the fragment that stores the previous version, then a new location must be found for storing the compressed extent. Simply allocating new storage space is certainly an option, but this option is far from optimal, as allocation consumes storage resources and increases latency. It also abandons the location of the previous version of the data, which becomes a hole. Thus, the data storage system 116 ends up consuming both the newly allocated space and the hole, just for effecting storage of the compressed data of extent 135-1, at least until garbage collection can run.

To avoid this wasteful scenario, the log manager 136 may create and apply the batch-hole list 140. To create the batch-hole list 140, the log manager 136 gathers mapping metadata, such as VBMs 156, that the file system 150 uses for mapping extents 135 in the current batch 134. VBMs will be found for all extents 135 that are overwrites but will not be found for extents 135 that are allocating writes, as no VBMs have yet been assigned for allocating extents. The act of gathering the VBMs 156 for the current batch is not expected to be burdensome, as the log manager 136 already needs to acquire the VBMs 156, e.g., for identifying physical addresses. Each of the VBMs 136 is provided for a respective segment and includes an extent list, which identifies each of the compressed extents in the segment, their sizes, and a reference weight. If the reference weight for an extent indicates zero references (nothing pointing to it), then the extent is a hole. The log manager 136 iterates over all of the VBMs used for mapping the current batch, reads their extent lists, and identifies all of the holes, along with their sizes and locations. The log manager 136 places this information into the batch-hole list 140, which thus lists all holes specified by the metadata used for mapping the extents 135 of the current batch 134.

To apply the batch-hole list 140, the log manager 136 searches the batch-hole list 140 for an available hole. For example, upon determining that an overwrite of a compressed extent does not fit into the location where a previous version is stored, the log manager 136 checks the batch-hole list 140 for a hole that is big enough to accommodate the compressed extent. Preferably, the log manager 136 select a hole that is minimally large enough, so as not to waste space, but this is not required.

If a suitable hole is found, the log manager 136 claims that hole and reconfigures the mapping metadata for extent 135, so that the logical address of extent 135 resolves to the location of the selected hole, rather than to the previous fragment location. Changing the metadata is not expected to be burdensome, however, as the metadata has already been read into memory. When the log manager 136 goes to flush the current batch, it sends the compressed data of extent 135 to the new location. The selected hole is thus reused, and the extent 135 is stored without having to allocate any new storage space.

When applied over many overwrites, the use of the batch-hole list 140, which we refer to as "batch-relocate," can result in a great improvement in storage efficiency. As the number of holes in the batch-hole list 140 is generally greater than one (and sometimes measures in the tens), the chances of finding a hole into which the current extent can fit are very good, much better than the changes of the data fitting in the single, currently-mapped fragment, which is the only option available with fragment-fill. The use of batch-relocate is thus a significant enabler of inline compression, as it allow a storage system to benefit from data compression, rather than undermining the benefits of data compression by creating unreusable holes, or holes that cannot be reused until garbage collection can be run.

In some cases, batch-relocate does not succeed in finding a hole that is big enough to accommodate an overwrite for a current extent 135. For example, the number of holes in the batch-hole list 140 may be small, or the holes may be skewed toward small holes with no large holes available for large overwrites. It is in such cases that the FS-hole list 160 can help to realize even greater improvements in storage efficiency. Unlike the batch-hole list 140, which is limited to VBMs used by the current batch 134, the FS-hole list has a much larger domain, i.e., that of the entire file system 150. For example, any time the file system 150 creates a new hole (e.g., each time fragment-fill fails), the file system adds the newly-formed hole to the FS-hole list 160. The FS-hole list can thus grow to a large size, such that many overwrites that fail batch-relocate will still be able to find matching holes by using the FS-hole list 160, a process we call "FS-relocate."

One should appreciate that embodiments can be constructed that use only batch-relocate or only FS-relocate. Both are not required and either can be used independently with positive effects on storage efficiency. Preferably, however, both batch-relocate and FS-relocate are used together, and preferably with FS-relocate invoked only after batch-relocate has been attempted and has failed to locate a suitable hole.

Figure 2:
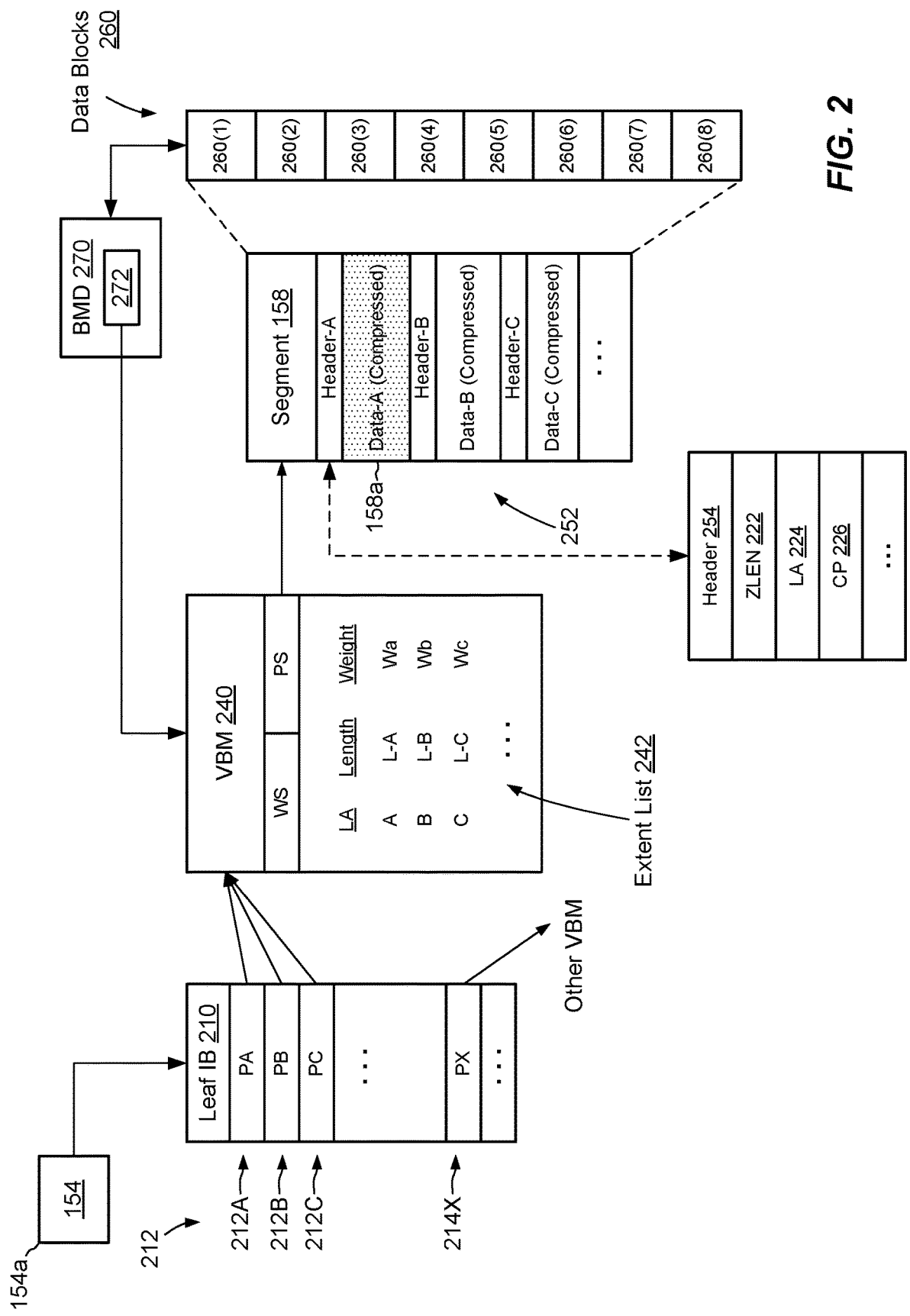
FIG. 2 is a block diagram showing an example metadata arrangement that supports storage of compressed data in a file system of FIG. 1.

FIG. 2 shows example metadata structures that support mapping of extents 135 to file system locations. The metadata structures include inode 154, leaf IB (Indirect Block) 210, and VBM 240. Leaf IB 210 includes block pointers 212, which map logical addresses of the file 154a to corresponding physical addresses (FSBNs) in the file system 150. For example, block pointer 212A maps logical address A, block pointer 212B maps logical address B, and block pointer 212C maps logical address C. Each logical address (A, B, or C) describes a block-sized extent of storage in file 154a, even though the underlying data may be compressed to much less than the size of a block.

Several block pointers 212 in leaf IB 210 point to VBM 240 for addressing respective extents of compressed data in segment 158. Leaf IB 210 may store additional block pointers, such as pointer 214X, which point to other segments via other VBMs (not shown). Leaf IB 210 may include any number of block pointers, a typical number being 1024.

As shown in FIG. 2, VBM 240 has a weight WS and a pointer PS. The weight WS indicates the number of block pointers (e.g., block pointers 212) that point to the VBM 240. The pointer PS points to a physical address (FSBN) of the segment 158, which by convention may be selected to be the address of the first data block in segment 158, i.e., block 260(1). The VBM 240 has an extent list 242. The extent list 242 describes the contents of segment 158 and relates, for each extent of compressed data, the logical address (LA) of that extent in the file 154a (e.g., A, B, or C), the length of that compressed data in the segment 158 (e.g., L-A, L-B, or L-C, e.g., in sectors), and a weight (Wa, Wb, or Wc), where each weight indicates the number of block pointers that point to the respective extent. In an example, the sum of all weights in the extent list 242 equals the total weight WS of the VBM 240.

Segment 158 is composed of contiguous data blocks 260, i.e., blocks 260(1) through 260(8). For purposes of storing compressed data, boundaries between blocks 260(1) through 260(8) are ignored and the segment 158 is treated as one continuous space.

In an example, segment 158 has associated per-block metadata (BMD) 270. By convention, the BMD 270 of the segment 158 is provided for the first block 260(1) in segment 158. The file system 150 ensures that BMD 270 has a known location relative to block 260(1), and vice-versa, such that the location of one implies the location of the other. BMD 270 may also store a back-pointer 272 to the VBM 240, i.e., to the particular VBM that maps the compressed data stored in segment 158.

The detail shown in segment 158 indicates an example layout 252 of compressed extents. For instance, Header-A can be found at Loc-A, immediately before compressed Data-A. Likewise, Header-B can be found at Loc-B, immediately before compressed Data-B. Similarly, Header-C can be found at Loc-C, immediately before compressed Data-C.

An example compression header 254 is shown for illustration. The compression header 254 is a fixed-size data structure that includes multiple data elements, such as the following:

ZLEN 222: the length of the corresponding extent of compressed data; e.g., in bytes.

LA 224: the logical address (e.g., A, B, C, and so on) of the corresponding extent of compressed data within the file 154a.

CP 226: a compression procedure (or algorithm) used to compress the data, such as LZ-L3, LZH-L4, "Hardware," and so on.

The header 254 may also include additional elements, such as CRC (Cyclic Redundancy Check) and various flags.

To perform batch-relocate, the log manager 136 attempts to gather VBMs (like VBM 240) for all extents 135 in the current batch 134. For each extent that is an overwrite, the log manager 136 locates a VBM for that extent, accesses the extent list 242 of each located VBM, identifies the holes in each extent list 242 (based on the extents having a weight that indicates zero references), and adds the identified holes to the batch-hole list 140.

Figure 3:
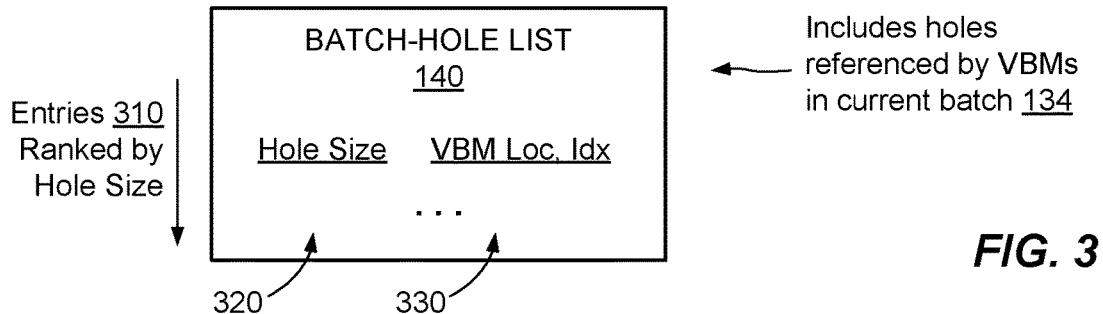
FIG. 3 is a block diagram of an example batch hole list as shown in FIG. 1.

FIG. 3 shows an example batch-hole list 140 in greater detail. Here, batch-hole list 140 includes multiple entries 310, with each entry 310 providing, for each hole, a hole size 320 and a hole location 330. In an example, each hole size 320 is measured in sectors (512 B units) and each hole location 330 is provided as a VBM location and an index ("Idx"). The batch-hole list 140 may specify the VBM location as a memory address, e.g., as an address in a VBM cache (not shown) and may specify the index as an integer that identifies an entry number (e.g., row) in the extent list 242 of the addressed VBM. In an example, the batch-hole list 140 ranks entries 310 by size, e.g., from smallest to largest, to permit fast lookups and to enable the log manager 136 to determine whether a suitable hole can be found in the batch-hole list 140 without having to interrogate each entry 310.

Figure 4:
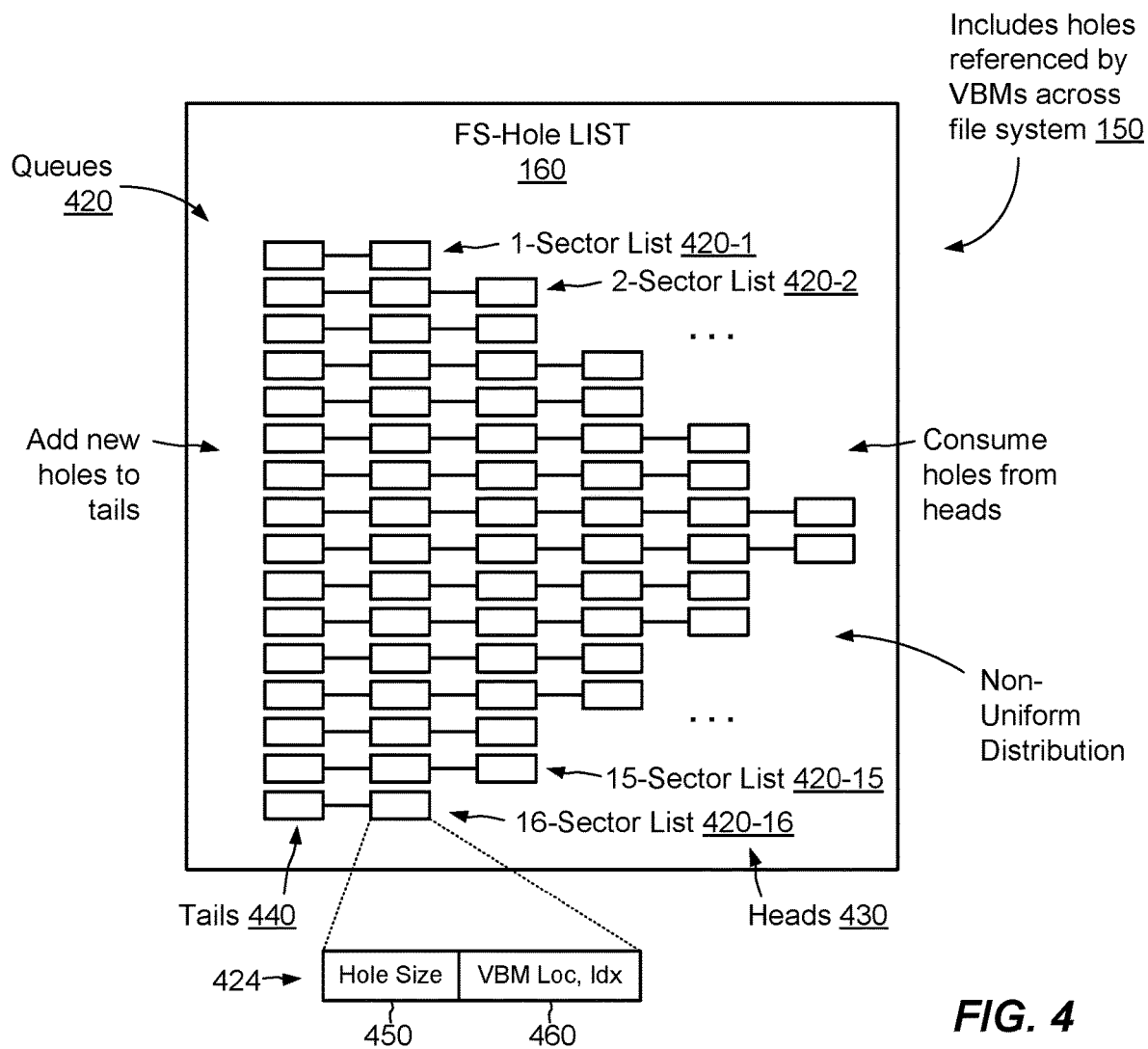
FIG. 4 is a block diagram of an example FS-hole list as shown in FIG. 1.

FIG. 4 shows an example FS-hole list 160 in greater detail. The FS-hole list 160 is organized in multiple queues 420, with each queue dedicated to holes of a respective size. Sixteen queues 420-1 through 420-16 are shown, for sixteen possible hole sizes, with queue 420-1 dedicated to 1-sector holes, queue 420-2 directed to 2-sector holes, and so on. Each of the queues 420 has a head 430 and a tail 440 and may be constructed, for example, as a linked list. In general, holes are consumed from the head of each queue and newly-discovered holes are appended to the tail of each queue. As shown at the bottom of the figure, each element of a queue takes the form of a hole designator 424, which may specify a hole size 450 and a hole location 460 (e.g., VBM location and index). In some examples, hole size 450 may be omitted as it is implied from the queue 420 in which the hole designator 424 is placed. VBM location may be provided in the form of a memory location at which the indicated VBM was cached at the time the hole designator 424 was created.

If left unconstrained, the queues 420 can grow to excessive lengths. In addition, hole designators 424 tend to become stale over time, as VBMs are recycled out of cache. In some examples, the FS-hole list 160 limits the length of each queue 420 to a predetermined number of hole designators 424. Once a queue 420 reaches its maximum length, the oldest hole designators are discarded from the heads 430 as new hole designators are applied to the tails 440. Each queue 420 thus contains the most recent hole designators 424 of the respective size.

In some examples, the FS-hole list 160 specifies different maximum allowed lengths for different queues 420, based upon a frequency with which holes in the respective queues 420 are expected to be needed. A distribution of maximum lengths may be approximately Gaussian, for example, or at least greater for mid-sized holes than it is for holes at the size extremes. Thus, the limits for queues 420-7 and 420-8 would normally be greater than the limits for queues 420-1 and 420-16. Although the figure shows the maximum numbers of hole designators 424 as small numbers (between 2 and 6 holes), this is for illustration only. Actual limits on queue lengths may be much larger than those illustrated.

FIGS. 5-9 show example methods that may be carried out in connection with the environment 100. Such methods are typically performed, for example, by the software constructs described in connection with FIG. 1, which reside in the memory 130 of the storage processor 120 and are run by the set of processing units 124. The various acts of these methods may be ordered in any suitable way. Accordingly, embodiments may be constructed in which acts are performed in orders different from those illustrated, which may include performing some acts simultaneously.

Figure 5:
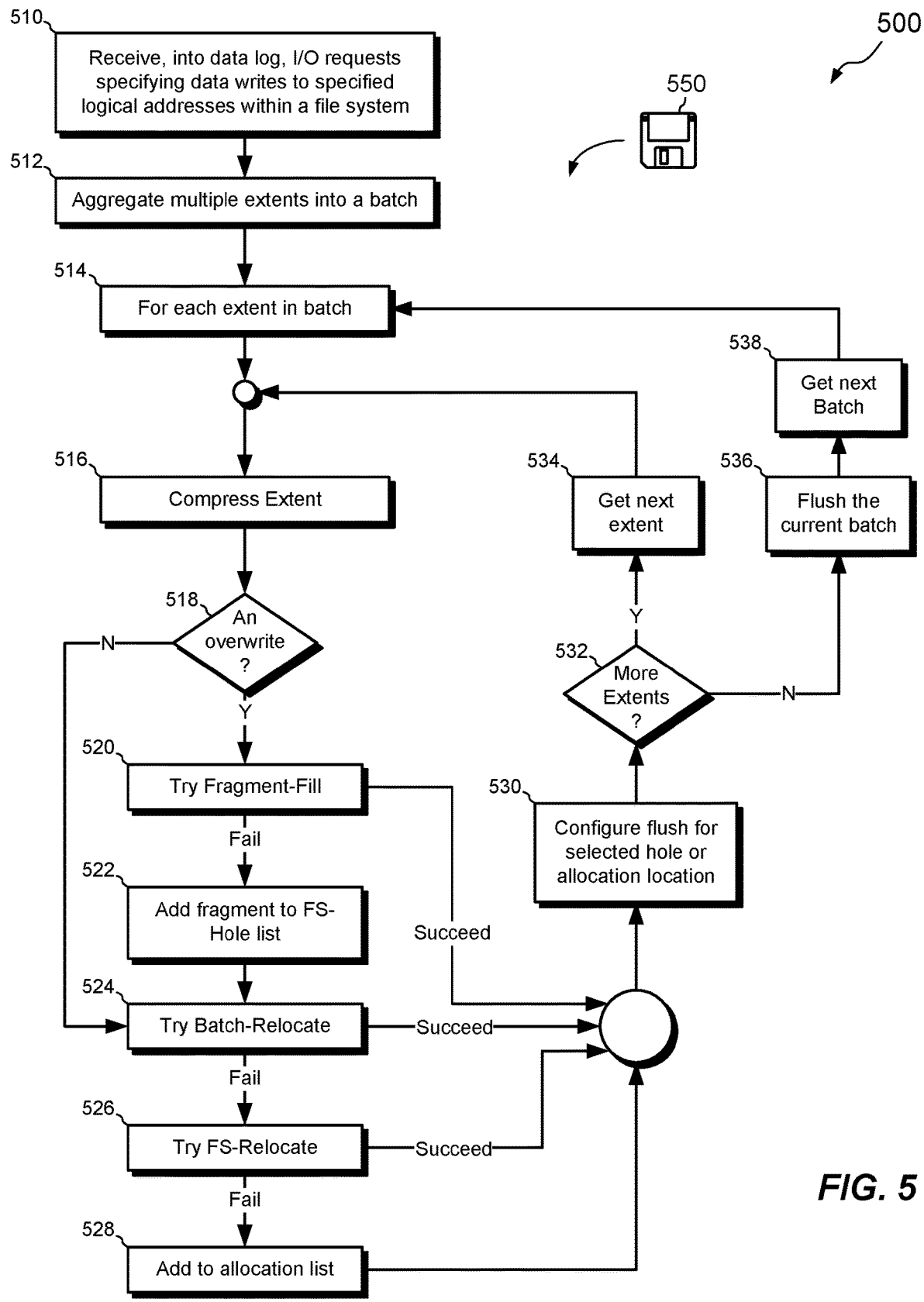
FIG. 5 is a flowchart that shows an example method of writing data in the data storage system of FIG. 1.

FIG. 5 shows an example method 500 for performing writes in the data storage system 116. At 510, the data storage system 116 receives I/O requests 112W from hosts 110. Each I/O request 112W specifies a write of respective data at a respective logical address. The data storage system 116 receives the data specified by each such write into the data log 132, and the buffer 133 holds the data in block-sized extents 135.

At 512, the buffer 133 aggregates extents 135 into batches 134. The buffer 133 may use any suitable technique for aggregating extents 135, with one example being to place extents 135 in batches 134 on a time-ordered basis, based on time of receipt.

At 514, the log manager 136 obtains a current extent 135 from the current batch 134 and proceeds to process the current extent 135. For example, at 516 the log manager 136 directs the compressor 138 to compress the current extent 135. At 518, the log manager 136 determines whether the current extent 135 is being written as an overwrite or as an allocating write. For instance, the log manager 136 attempts to resolve the logical address of the current extent 135 to a corresponding physical address. If the write is an allocating write, the log manager 136 will fail to locate any VBM 240 for the current extent 135, as none has been assigned. However, if the write is an overwrite, the log manager 136 will normally succeed in locating a VBM 240 for the specified logical address. If the log manager 136 determines that the write of the current extent 135 is an overwrite, operation proceeds to 520, whereupon the log manager 136 attempts a fragment-fill operation (or directs the file system 150 to do so).

If fragment-fill fails, e.g., because the compressed data of extent 135 are too big to fit into the space that was provided for the previous version of data, then the current space at the location of the previous version will become a hole, and the SP 120 adds the hole to the FS-hole list 160. At 524, the method 500 attempts to perform a batch-relocate operation, by attempting to locate a hole in the batch-hole list 140 that is big enough to accommodate the compressed data of extent 135.

If batch-relocate fails, e.g., because no big-enough hole can be found, then operation proceeds to 526, whereupon the method 500 attempts an FS-relocate operation. If even FS-relocate fails, operation proceeds to 528, where the method 500 adds the current extent 135 to an allocation list, i.e., a list of extents that require new allocations.

All paths then converge at 530, which partially configures the next flush for the selected hole or the new allocation. For example, if any of the hole-placement attempts succeed (fragment-fill at 520, batch-relocate at 524, or FS-relocate at 526), then the log manager 136 assigns the current extent 135 to the located hole. The compressed data of current extent 135 gets written to the located hole when the batch 134 is flushed. Mapping metadata is also adjusted, if necessary, so that the logical address of the current extent 135 points to the proper physical address. If the current extent 135 requires new allocation, then flushing of the current batch also involves allocating new space and establishing mapping metadata for the current extent 135.

With processing of the current extent 135 complete, operation proceeds to 532, which asks whether there are any more extents to be processed in the current batch. If so, the log manager 136 gets a next extent 135 from the current batch (act 534) and operation returns to 516, whereupon the new current extent is processed along the path already described. However, if there are no more extents to be processed in the current batch, then operation proceeds instead to 536, where the log manager 136 flushes the current batch to the file system 150. At 538, processing of the current batch is complete. A next batch 134 is selected and the method 500 carries out processing for the next batch as described above.

Although FIG. 5 shows extents 135 being processed one after another, some embodiments may process extents 135 of a given batch 134 in parallel, e.g., by employing respective threads for respective extents 135. Thus, the example method as shown is intended merely to be illustrative.

Figure 6:
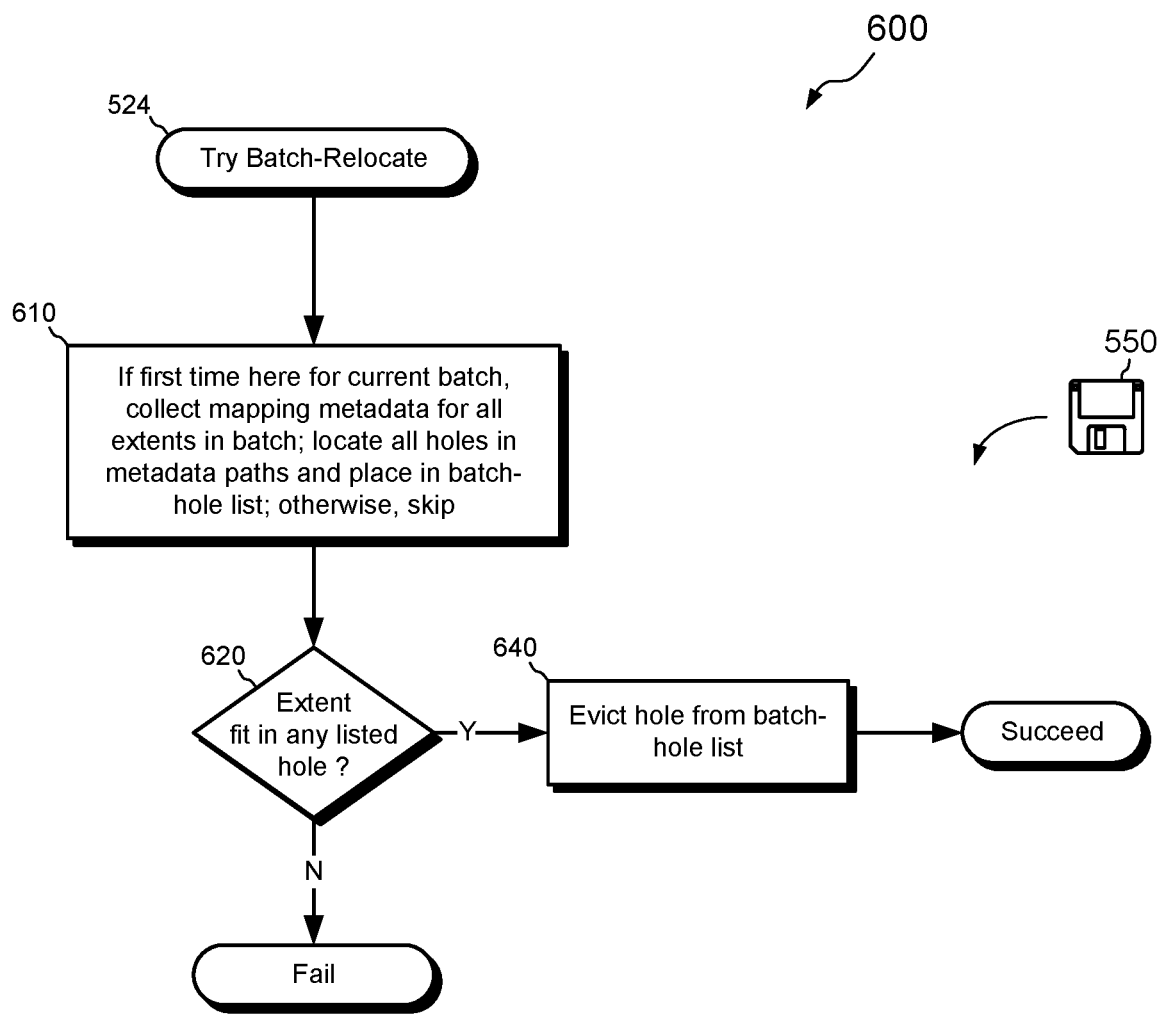
FIG. 6 is a flowchart that shows an example method of obtaining a hole in which to write data using a batch-relocate operation.

FIG. 6 shows a method 600 for performing the batch-relocate operation. The method 600 is an expansion of act 524 (Try Batch-Relocate) of FIG. 5. However, the method 600 may also be performed independently of fragment-fill and/or FS-relocate.

At 610, the log manager 136 collects mapping metadata for all extents 135 in the current batch 134. For example, the log manager 136 follows the logical addresses associated with all extents 135 in the current batch and identifies any VBMs 240 placed along their mapping paths. For each VBM located, the log manager 136 reads the extent list 242 of that VBM, identifies any holes, and adds the holes to the batch-hole list 140. The act 610 need be performed only once for the current batch, such that this act may be skipped if it has already been performed for an earlier-processed extent in the same batch.

At 620, the log manager 136 determines whether the current extent 135 fits into any hole in the batch-hole list 140. If there is no big-enough hole, the batch-relocate operation fails. Operation may then return to the method 500 and proceed to FS-relocate (act 526).

However, if a big-enough hole is found in the batch-hole list 140, operation proceeds to 640, where the log manager 136 evicts selected hole from the batch-hole list 140 or otherwise renders the selected hole invalid, such that later attempts to place extents in the same batch do not use the already-claimed hole. The batch-hole operation thus succeeds, and operation returns to method 500.

Figure 7:
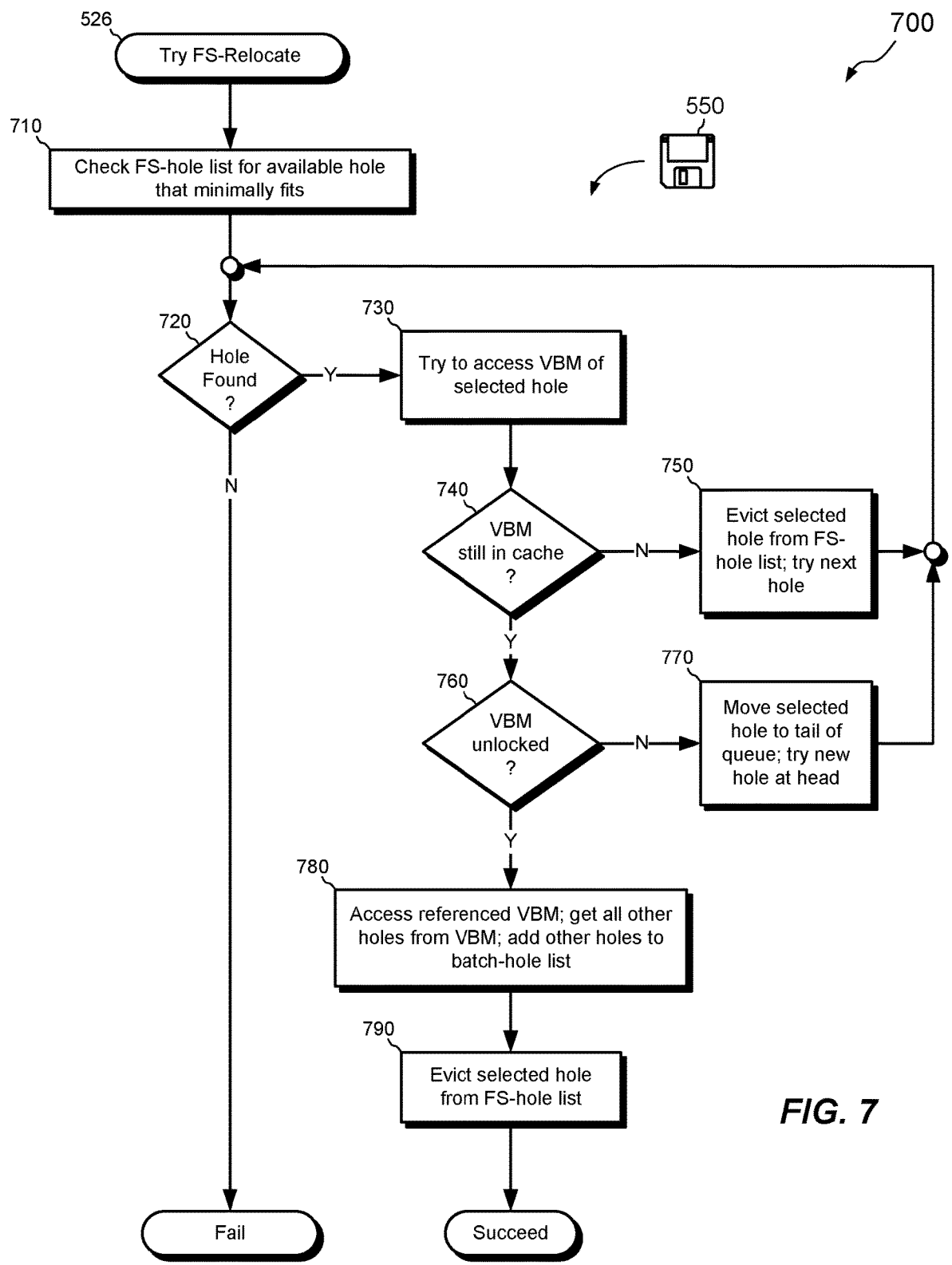
FIG. 7 is a flowchart that shows an example method of obtaining a hole in which to write data using an FS-relocate operation.

FIG. 7 shows an example method 700 for performing the FS-relocate operation. The method 700 is an expansion of act 526 (Try FS-Relocate) of FIG. 5. However, the method 700 may also be performed independently of fragment-fill and/or batch-relocate.

At 710, the log manager 136 checks the FS-hole list 160 for an available hole large enough to accommodate the compressed data of extent 135. For example, the log manager 136 obtains the size of the compressed extent and jumps to the queue 420 for holes of that size. If the queue is empty, the log manager 136 may check the next queue, one size up. If no hole large enough for the extent can be found, then FS-relocate fails and operation returns to the method 500. However, if a suitable hole is found, that hole is selected from the head 430 of the corresponding queue and operation proceeds to 730, whereupon the log manager 136 attempts to access the VBM referenced by the hole descriptor 424 of the selected hole.

At 740, the log manager 136 determines whether the referenced VBM is still present in volatile cache. If not, the VBM reference in the hole descriptor 424 may be stale and operation proceeds to 750. At 750, the selected hole with the stale reference is evicted from the FS-hole list 160, and the log manager 136 attempts to get another hole from the head 430 of the same queue (or from a queue for larger holes if the current queue is empty). Operation then returns to 720.

However, if the referenced VBM at 740 is still in cache, operation proceeds to 760, where the log manager 136 determines whether the referenced VBM is locked. The referenced VBM may be locked, for example, if it is currently being accessed for processing another extent (extents may be processed in parallel). If the VBM is locked, operation proceeds to 770, where the log manager 136 moves the selected hole from the head of the selected queue 420 to the tail of that queue, where the selected hole is treated as a newly-discovered hole. A new hole may be selected from the head of that same queue, and operation returns to 720.

If the log manager 136 determines at 760 that the referenced VBM is not locked, then operation proceeds to 780, whereupon the log manager 136 accesses the referenced VBM. When doing so, the log manager 136 preferably also checks the extent list 242 in the referenced VBM to identify all other holes that are referenced by that same VBM. The log manager 136 then adds all such identified holes to the batch-hole list 140, such that the holes pointed to by the referenced VBM, which is in cache, become part of the hole domain of the current batch. Placing these holes in the batch-hole list 140 can help to improve the effectiveness of batch-relocate operations performed later on extents in the same batch.

At 790, the FS-hole list 160 evicts the selected hole, as it has been claimed and is unavailable for placement of other extents. The FS-relocate operation then succeeds, and operation returns to the method 500.

Figure 8:
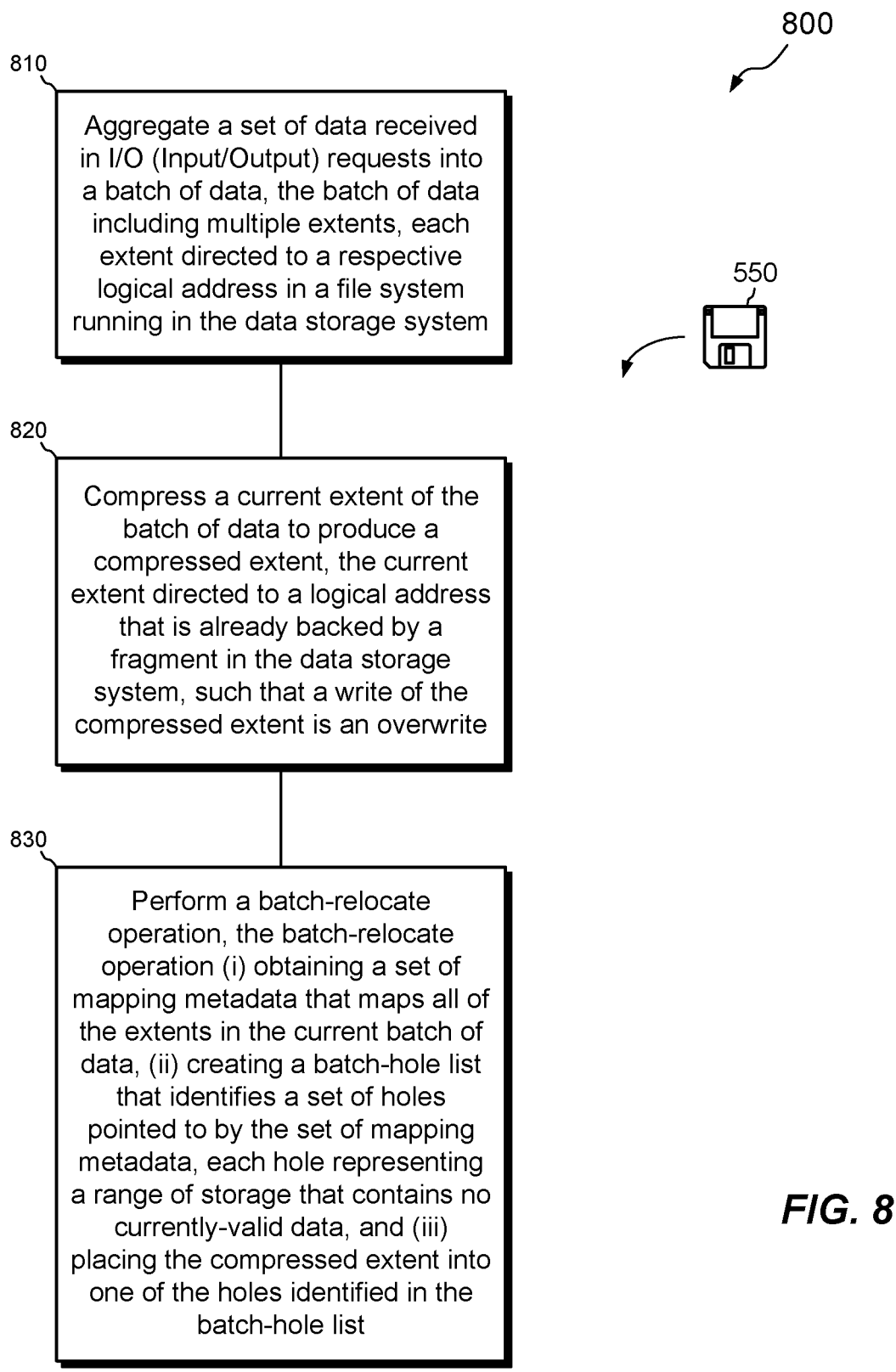
FIG. 8 is a flowchart that shows an example method of writing data in a hole obtained using the batch-relocate operation.

FIG. 8 shows an example method 800 for performing writes in a data storage system using a batch-relocate operation. The method 800 may be performed independently of fragment-fill and/or FS-relocate and regardless of whether those operations are carried out.

At 810, a set of data received in I/O (Input/Output) requests 112W is aggregated into a batch of data 134. The batch of data 134 includes multiple extents 135, and each extent 135 is directed to a respective logical address LA in a file system 150 running in the data storage system 116.

At 820, a current extent 135 of the batch of data 134 is compressed to produce a compressed extent. The current extent is directed to a logical address that is already backed by a fragment (e.g., 158a) in the data storage system 116, such that a write of the compressed extent is an overwrite.

At 830, a batch-relocate operation 600 is performed. The batch-relocate operation 600 (i) obtains a set of mapping metadata (e.g., VBMs) that maps all of the extents 135 in the current batch 134 of data, (ii) creates a batch-hole list 140 that identifies a set of holes pointed to by the set of mapping metadata, each hole representing a range of storage that contains no currently-valid data, and (iii) places the compressed extent into one of the holes identified in the batch-hole list 140.

Figure 9:
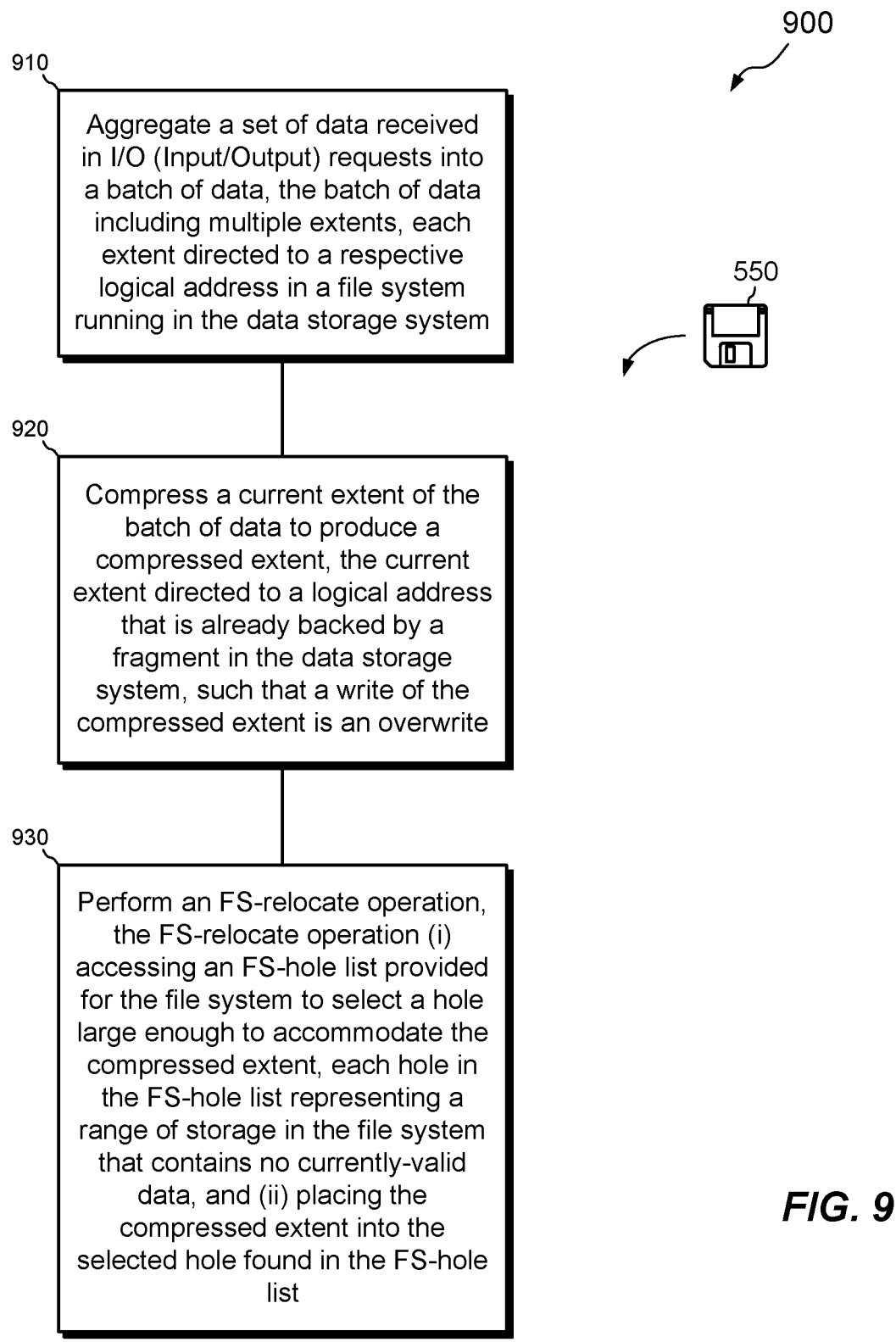
FIG. 9 is a flowchart that shows an example method of writing data in a hole obtained using the FS-relocate operation.

FIG. 9 shows an example method 900 for performing writes in a data storage system using an FS-relocate operation. The method 900 may be performed independently of fragment-fill and/or batch-relocate and regardless of whether those operations are carried out.

At 910, a set of data received in I/O (Input/Output) requests 112W are aggregated into a batch of data 134. The batch of data 134 includes multiple extents 135, and each extent 135 is directed to a respective logical address LA in a file system 150 running in the data storage system 116.

At 920, a current extent 135 of the batch of data 134 is compressed to produce a compressed extent. The current extent is directed to a logical address that is already backed by a fragment (e.g., 158a) in the data storage system 116, such that a write of the compressed extent is an overwrite.

At 930, an FS-relocate operation 700 is performed. The FS-relocate operation 700 (i) accesses an FS-hole list 160 provided for the file system 150 to select a hole large enough to accommodate the compressed extent, each hole in the FS-hole list 160 representing a range of storage in the file system 150 that contains no currently-valid data, and (ii) places the compressed extent into the selected hole found in the FS-hole list 160.

An improved technique has been described for performing writes in a data storage system 116. The technique includes aggregating data received in a set of I/O requests 112W into a batch 134 that includes multiple extents 135 of data. After compressing a current extent 135 of the batch 134 and determining that the compressed extent does not fit in a space where a previous version (e.g., 158a) of the extent is stored, the technique performs a global-relocate operation 700 by accessing an FS-hole list 160 provided for the file system 150 and selecting a hole, from the FS-hole list 160, which is large enough to accommodate the compressed extent. The technique then places the compressed extent in the selected hole.

Having described certain embodiments, numerous alternative embodiments or variations can be made. For example, although certain metadata structures are specifically shown and described, these are merely examples, as other types of metadata structures may also be used.

Also, although a technique for performing writes has been described in connection with inline compression, a similar technique may be used for background compression. Thus, embodiments hereof are limited to inline compression only.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIGS. 5-9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of writing data in a data storage system, the method comprising:

aggregating a set of data received in I/O (Input/Output) requests into a batch of data, the batch of data including multiple extents, each extent directed to a respective logical address in a file system running in the data storage system;

compressing a current extent of the batch of data to produce a compressed extent, the current extent directed to a logical address that is already backed by a fragment in the data storage system, such that a write of the compressed extent is an overwrite; and performing an FS-relocate operation, the FS-relocate operation (i) accessing an FS-hole list provided for the file system to select a hole large enough to accommodate the compressed extent, each hole in the FS-hole list representing a range of storage in the file system that contains no currently-valid data, and (ii) placing the compressed extent into the selected hole found in the FS-hole list, wherein the FS-hole list contains multiple queues, each queue specifying a respective set of holes of a respective size, and wherein selecting a hole large enough to accommodate the compressed extent includes (i) selecting, based on a size of the compressed extent, the queue that specifies holes that are minimally large enough to accommodate the compressed extent, and (ii) identifying one of the holes from the selected queue as the selected hole.

2. The method of claim 1, wherein the FS-relocate operation is performed in response to first determining that the compressed extent does not fit into a space that the fragment already occupies.

3. The method of claim 2, wherein the FS-relocate operation is performed in response to first determining that no hole large enough to accommodate the compressed extent is contained in a batch-hole list, the batch-hole list formed by (i) obtaining a set of mapping metadata that maps all of the extents in the batch of data, (ii) identifying a set of holes pointed to by the set of mapping metadata, and (iii) adding each of the identified set of holes to the batch-hole list.

4. The method of claim 1, wherein each size of holes for which the queues are provided is an integer multiple of one sector (512 Bytes).

5. The method of claim 1, wherein the queues include first through N-th queues provided for holes of sizes ranging from one through N sectors, respectively, wherein the method further comprises limiting a maximum number of holes in each queue, and wherein the maximum number of holes for each of the first and N-th queues is not greater than the maximum number of holes for each of the second through (N−1)-th queues.

6. The method of claim 1, wherein each of the queues in the FS-hole list has a head and a tail, and wherein, when selecting the hole into which to place the compressed extent includes selecting the hole at the head of the selected queue.

7. The method of claim 6, further comprising:
discovering a new hole in the file system;
identifying a queue into which to place the new hole based on a size of the new hole; and
adding the new hole to the tail of the selected queue.

8. The method of claim 7, further comprising, prior to selecting the hole in the FS-hole list:
identifying an initial hole into which to place the compressed extent, the initial hole specified at the head of a current queue in the FS-hole list;
performing a testing operation configured to produce a first result in response to confirming that a set of mapping metadata for the initial hole currently resides in volatile-memory cache, and to produce a second result otherwise; and
in response to the testing operation producing the second result, (i) removing the initial hole from the head of the current queue and from the FS-hole list, and (ii) identifying a next hole in the current queue now at the head of the selected queue, the next hole providing the selected hole into which the compressed extent is placed.

9. The method of claim 7, further comprising, prior to identifying the hole in the FS-hole list:
identifying an initial hole into which to place the compressed extent, the initial hole specified at the head of a current queue in the FS-hole list;
performing a second testing operation configured to produce a first result in response to confirming that a set of mapping metadata for the initial hole is unlocked, and to produce a second result otherwise; and
in response to the testing operation producing the second result, (i) moving the initial hole from the head of the current queue to the tail of the current queue, and (ii) identifying a next hole in the current queue now at the head of the selected queue, the next hole providing the selected hole into which the compressed extent is placed.

10. The method of claim 1, further comprising, prior to placing the compressed extent into the selected hole in the FS-hole list:
accessing a set of mapping metadata that maps the selected hole;
identifying, from the accessed set of mapping metadata, a set of additional holes referenced in the accessed set of mapping metadata; and
adding the set of additional holes to the batch-hole list.

11. The method of claim 1, further comprising, in response to determining that the compressed extent does not fit into the space that the fragment already occupies, adding the space that the fragment occupies to the FS-hole list.

12. The method of claim 1, further comprising, in response to determining that the compressed extent does not fit into the space that the fragment already occupies, adding the space that the fragment occupies to the FS-hole list.

13. A data storage system, comprising control circuitry that includes a set of processing units coupled to memory, the control circuitry constructed and arranged to:
aggregate a set of data received in I/O (Input/Output) requests into a batch of data, the batch of data including multiple extents, each extent directed to a respective logical address in a file system running in the data storage system;
compress a current extent of the batch of data to produce a compressed extent, the current extent directed to a logical address that is already backed by a fragment in the data storage system, such that a write of the compressed extent is an overwrite; and
perform an FS-relocate operation, the FS-relocate operation (i) accessing an FS-hole list provided for the file system to select a hole large enough to accommodate the compressed extent, each hole in the FS-hole list representing a range of storage in the file system that contains no currently-valid data, and (ii) placing the compressed extent into the selected hole found in the FS-hole list,
wherein the control circuitry is constructed and arranged to perform the FS-relocate operation in response to first determining that no hole large enough to accommodate the compressed extent is contained in a batch-hole list, the batch-hole list formed by (i) obtaining a set of mapping metadata that maps all of the extents in the batch of data, (ii) identifying a set of holes pointed to by the set of mapping metadata, and (iii) adding each of the identified set of holes to the batch-hole list.

14. A computer program product including a set of non-transitory, computer-readable media having instructions which, when executed by control circuitry of a data storage system, cause the control circuitry to perform a method for writing data, the method comprising:
aggregating a set of data received in I/O (Input/Output) requests into a batch of data, the batch of data including multiple extents, each extent directed to a respective logical address in a file system running in the data storage system;
compressing a current extent of the batch of data to produce a compressed extent, the current extent directed to a logical address that is already backed by a fragment in the data storage system, such that a write of the compressed extent is an overwrite; and
performing an FS-relocate operation, the FS-relocate operation (i) accessing an FS-hole list provided for the file system to select a hole large enough to accommodate the compressed extent, each hole in the FS-hole list representing a range of storage in the file system that contains no currently-valid data, and (ii) placing the compressed extent into the selected hole found in the FS-hole list, wherein the FS-hole list contains multiple queues, each queue specifying a respective set of holes of a respective size, and wherein selecting a hole large enough to accommodate the compressed extent includes (i) selecting, based on a size of the compressed extent, the queue that specifies holes that are minimally large enough to accommodate the compressed extent, and (ii) identifying one of the holes from the selected queue as the selected hole.

15. The computer program product of claim 14, wherein each size of holes for which the queues are provided is an integer multiple of one sector (512 Bytes).

16. The computer program product of claim 15, wherein the method further comprises, prior to selecting the hole in the FS-hole list:

identifying an initial hole into which to place the compressed extent, the initial hole specified at the head of a current queue in the FS-hole list;

performing a testing operation configured to produce a first result in response to confirming that a set of mapping metadata for the initial hole currently resides in volatile-memory cache, and to produce a second result otherwise; and in response to the testing operation producing the second result, (i) removing the initial hole from the head of the current queue and from the FS-hole list, and (ii) identifying a next hole in the current queue now at the head of the selected queue, the next hole providing the selected hole into which the compressed extent is placed.

17. The computer program product of claim 14, wherein the method further comprises, prior to placing the compressed extent into the selected hole in the FS-hole list:

accessing a set of mapping metadata that maps the selected hole;

identifying, from the accessed set of mapping metadata, a set of additional holes referenced in the accessed set of mapping metadata; and adding the set of additional holes to the batch-hole list.

* * * * *